(No Model.)
C. H. SPRAGUE & W. J. WILEY.
HAT SIZING ROLL.
No. 383,998.  Patented June 5, 1888.
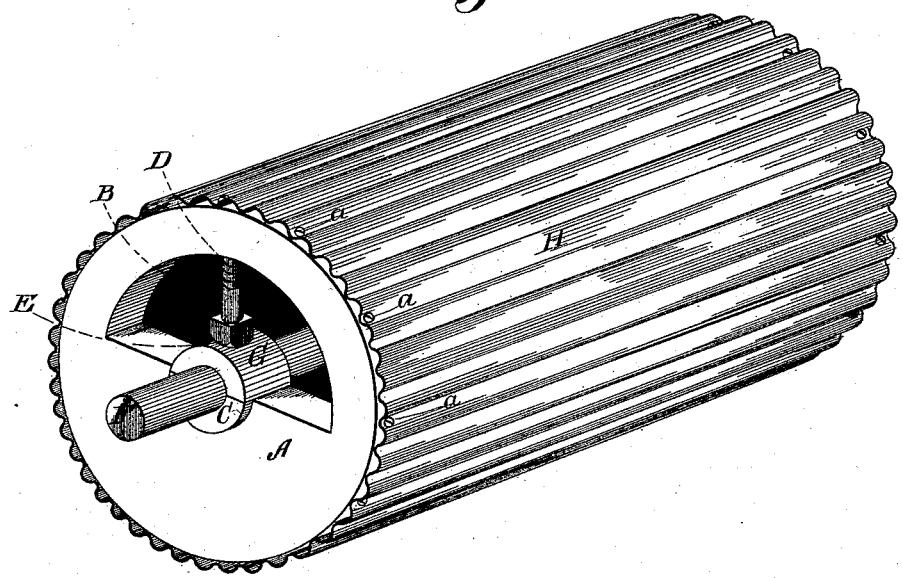
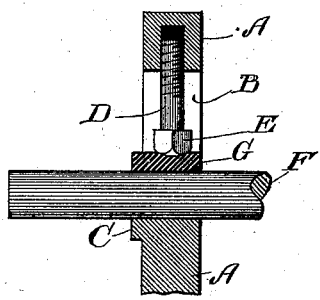
Witnesses.
S. Williamson.
Theo. G. Barnum.
Inventors.
Charles H. Sprague.
William J. Wiley.
By Smith and Hubbard, Attys.

United States Patent Office.

CHARLES H. SPRAGUE AND WILLIAM J. WILEY, OF DANBURY, CONNECTICUT.

HAT-SIZING ROLL.

SPECIFICATION forming part of Letters Patent No. 383,998, dated June 5, 1888.

Application filed July 28, 1887. Serial No. 245,471. (No model.)

*To all whom it may concern:*

Be it known that we, CHARLES H. SPRAGUE and WILLIAM J. WILEY, citizens of the United States, residing at Danbury, in the county of Fairfield and State of Connecticut, have invented certain new and useful Improvements in Hat-Sizing Rolls; and we do hereby declare the following to be a full, clear, and exact description of the invention, such as will enable others skilled in the art to which it appertains to make and use the same.

Our improvement relates to certain novel and useful improvements in the construction of rolls for hat-sizing machines, and also in the manner of securing such rolls upon shafts, and has for its object to provide a device of this description which shall be readily assembled, and, furthermore, to so mount the roll on its shaft that it may be readily detached therefrom, thereby permitting the substitution of another roll on the same shaft, or, in case the latter becomes unfit for use on account of breakage or wear, allowing the substitution of a new shaft with great facility; and with these ends in view our invention consists in certain details of construction and combination of elements, as will be hereinafter fully set forth, and then specifically designated by the claim.

In order that those skilled in the art to which our invention appertains may be enabled to comprehend and to make and use the same, we will now proceed to describe its construction and operation, special reference being had to the accompanying drawings, forming a part of this specification, in which—

Figure 1 is a perspective illustrating our improved roll secured on a shaft, and Fig. 2 a detail central vertical section taken through one of the heads and illustrating particularly our improved means of securing the roll upon the shaft.

Similar letters denote like parts in both figures of the drawings.

The heads of the roll are denoted by A, (one only of these heads appearing in the drawings,) and are made, preferably, from cast-iron. These heads are open through part of their area, as seen at B, and a bearing, C, is formed at the center of each head and leads into this opening.

D is a threaded bolt, which runs within bearings through the upper wall of the opening B, and on the lower extremity of said bolt is formed a head, E, which has an ordinary wrench-hold.

F is the shaft, which extends through the roll from head to head, and is seated within the bearings C.

G is a cap which fits snugly over the shaft at each of its bearings in said heads.

H is the body-surface of the roll, which we preferably form from corrugated sheet metal and attach to the heads by means of screws $a$.

In assembling the several parts of our improvement the shaft is run through the roll and seated within the bearings C. The caps are now placed over the shaft and the bolt D operated to cause the heads E to impinge firmly against the top of said caps, so as to bind the shaft tightly within its bearings. This construction has been found especially advantageous, owing to the fact that the shaft may be loosened and withdrawn from the heads in an exceedingly short space of time.

We do not wish to confine ourselves to the exact way shown and described of connecting up the heads by means of the corrugated cylinder, as this may be effected in a variety of ways without departing from the spirit of our invention.

Having thus described our invention, what we claim as new, and desire to secure by Letters Patent, is—

A hat-sizing roll comprising cast-metal heads secured within the ends of a corrugated cylinder and having openings, as shown, and bearings which lead into said openings, and the shaft extending through the cylinder within said bearings, the caps superimposed upon the shaft at these bearing-points, and the headed bolts depending from and running within the upper walls of said openings, substantially as and for the purpose hereinbefore set forth.

In testimony whereof we affix our signatures in presence of two witnesses.

CHARLES H. SPRAGUE.
    WILLIAM J. WILEY.

Witnesses:
 WILLIAM H. STARR,
 FREDERICK C. TOOLY.